(12) United States Patent
Huber

(10) Patent No.: US 7,434,734 B2
(45) Date of Patent: Oct. 14, 2008

(54) PLASTIC SUPPORT WITH A TRANSPONDER

(76) Inventor: Johann Huber, Weissdornstrasse 6, Kronstorf (AT) 4484

( * ) Notice: Subject to any disclaimer, the term of this patent is extended or adjusted under 35 U.S.C. 154(b) by 404 days.

(21) Appl. No.: 11/181,729

(22) Filed: Jul. 15, 2005

(65) Prior Publication Data

US 2006/0192677 A1 Aug. 31, 2006

(30) Foreign Application Priority Data

Feb. 16, 2005 (EP) .................................. 05003210

(51) Int. Cl.
*G06K 19/00* (2006.01)
(52) U.S. Cl. ...................... 235/487; 235/492
(58) Field of Classification Search ................. 235/487, 235/492
See application file for complete search history.

(56) References Cited

U.S. PATENT DOCUMENTS

2002/0170213 A1 11/2002 Latschbacher et al.

2005/0108912 A1* 5/2005 Bekker ........................ 40/633

FOREIGN PATENT DOCUMENTS

| DE | 38 37 175 C2 | 5/1990 |
| EP | 0 248 928 A1 | 12/1987 |
| EP | 1 246 152 A1 | 10/2002 |
| GB | 2 075 464 A | 11/1981 |

\* cited by examiner

*Primary Examiner*—Karl D. Frech
(74) *Attorney, Agent, or Firm*—Browdy and Neimark, P.L.L.C.

(57) ABSTRACT

A plastic support with a transponder having a data memory for the wireless transmission data from and to the plate-like plastic support is provided with attachment means for attachment to objects to be electronically marked. The transponder is arranged on or in a transponder support separate from the plastic support, which is able to be joined to the plastic support by catch or clamping means. Accordingly a transponder support provided with the transponder is able to be reused, after its intended first use, in a new plastic support. Accordingly overall costs may be substantially reduced.

9 Claims, 2 Drawing Sheets

PLASTIC SUPPORT WITH A TRANSPONDER

BACKGROUND OF THE INVENTION

The invention relates to a plate-like plastic support with a transponder having a data memory for the wireless transmission of data to and from the plastic support, which is provided with attachment means for attachment to objects to be electronically marked.

THE PRIOR ART

In the case of such a known plastic support as disclosed for instance in the European patent publication 1 246 152 A1 the transponder is permanently connected with the plastic support, and more especially welded into the plastic material. This leads to the disadvantage that the transponder together with the non-reusable plastic support only able to be employed once, which must be joined to the respective object to be marked, can not be reused. In comparison with the cheaply mass produced plastic support however the transponder represents a substantial cost factor so that the overall costs of such a plastic support provided with a transponder should be reduced for some applications.

SHORT SUMMARY OF THE INVENTION

One object of the invention is to create a plastic support with a transponder in the case of which the overall costs may be substantially reduced.

These and other aims are achieved by a plastic support with the features recited in claim 1.

In the case of the plastic support in accordance with the invention the transponder is arranged on or in a transponder support separate from the plastic support and able to be locked or clamped to the plastic support. Since it is accordingly not irreversibly joined to the plastic support, it may be reused after, for example, breaking up the plastic support, that is to say locked on a new plastic support. This leads to substantially reduced costs of the plastic support or, respectively, of the overall arrangement, which then are within the cost range of conventional plastic supports for marking objects without any transponder, as for example described in the British patent publication 2,075,464 A or the European patent publication 248 928 A1. Using the invention there is the possibility of electronically making objects at costs which lie within the normal range with plastic supports with bar codes or optical codes.

The features recited in the subclaims represent advantageous further developments and improvements of the plastic support as defined in claim 1.

In accordance with a preferred embodiment the plastic support possesses a slot for receiving the plate-like transponder support, which is held by it in a particularly satisfactory, safe manner, the transponder being simultaneously protected in the plastic support.

Preferably the plastic support possesses at least one flexible detent lug for snapping into corresponding detent pits within the transponder support, the at least one detent lug preferably being integrally molded or being formed by U-like slots. This detent lug is preferably provided with a detent projection, which is provided for fitting into the detent pit in the form of a through hole or recess in the transponder support.

In the case of a preferred structural design the plastic support comprises a plate-like part provided with the attachment means and a plate-like cover part, which are or which can be connected together, the transponder support being able to be locked or clamped between them. This means that the plastic support and the slot for receiving the transponder support may be produced particularly simply and cheaply, more especially because the support part or the cover part is provided with attachment pins which are designed for the attachment of the two parts together by fitting into corresponding pin receiving means in the respectively other part. These pins may advantageously simultaneously serve as guides on insertion of the transponder support.

In accordance with a further preferred embodiment the cover part is provided with a preferably pot-like projection for breaking off the cover part from the support part. This projection is preferably so dimensioned that on breaking off or severing the cover part either the complete cover part is broken up and accordingly detached or the attachment pins are broken this being followed by the cover part being detached from the support part.

The attachment means are in a known manner in the form of integrally molded teeth for being driven into the object to be marked, more especially a piece of wood or timber.

In order to facilitate driving the plastic support into the object to be marked preferably each of its four corners has a hook-like holding projection extending in the opposite direction to the teeth and are designed to be clipped on the head of a driving hammer.

The transponder support is preferably designed in the form of an elongated plate and in addition to the transponder bears a transmitting and/or receiving antenna, which is also integrated in the plate-like body.

As a transponder a radio frequency identification (RFID) transponder is preferred.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
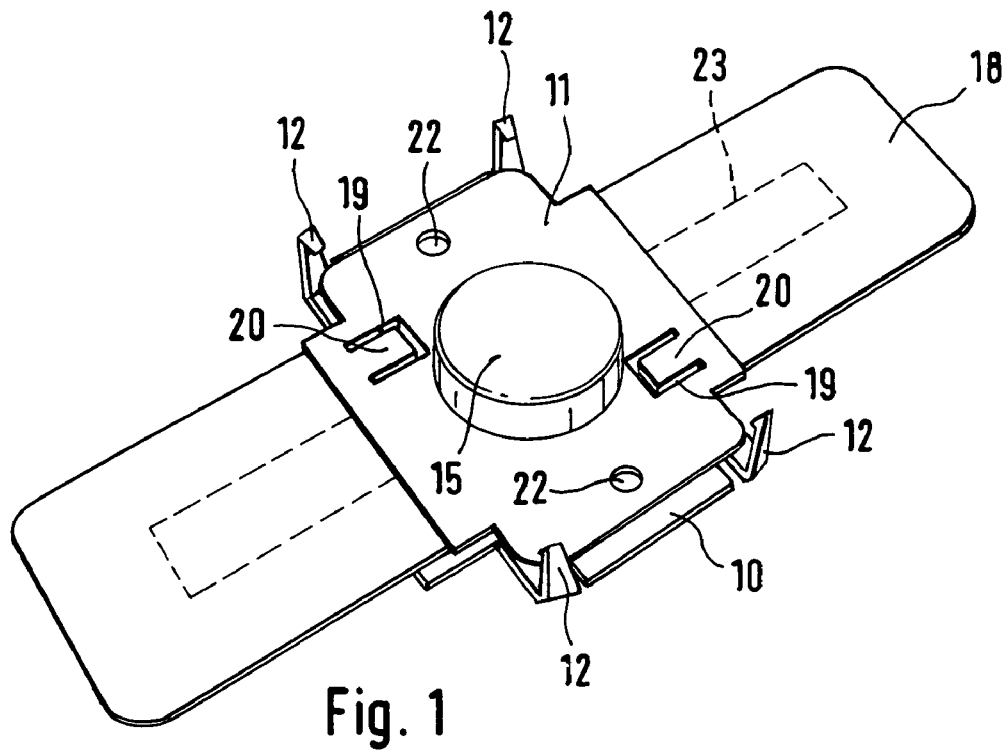
FIG. 1 is a perspective view of the entire plastic support with the inserted and snapped in transponder support as an embodiment of the invention.
Figure 2:
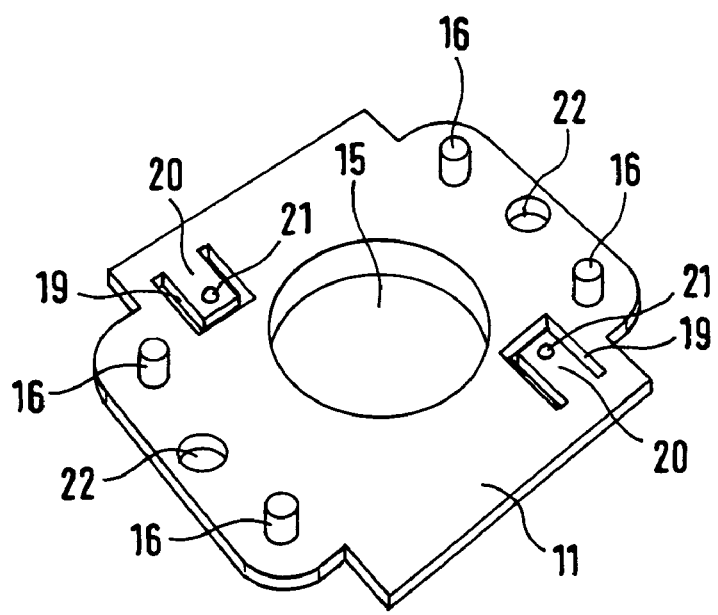
FIG. 2 is a perspective rear view of the cover part of the plastic support.
Figure 3:
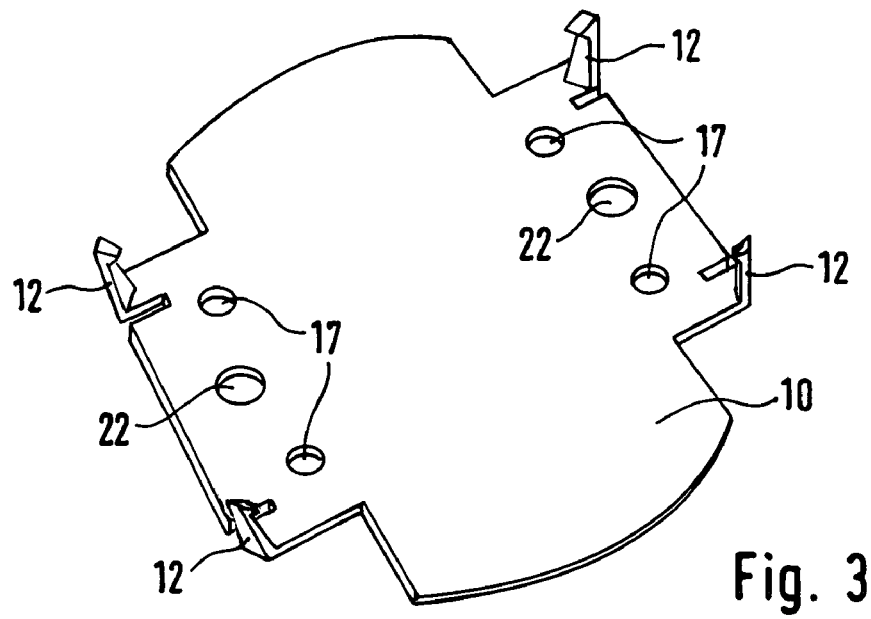
FIG. 3 is a perspective rear view of the support part of the plastic support.
Figure 4:
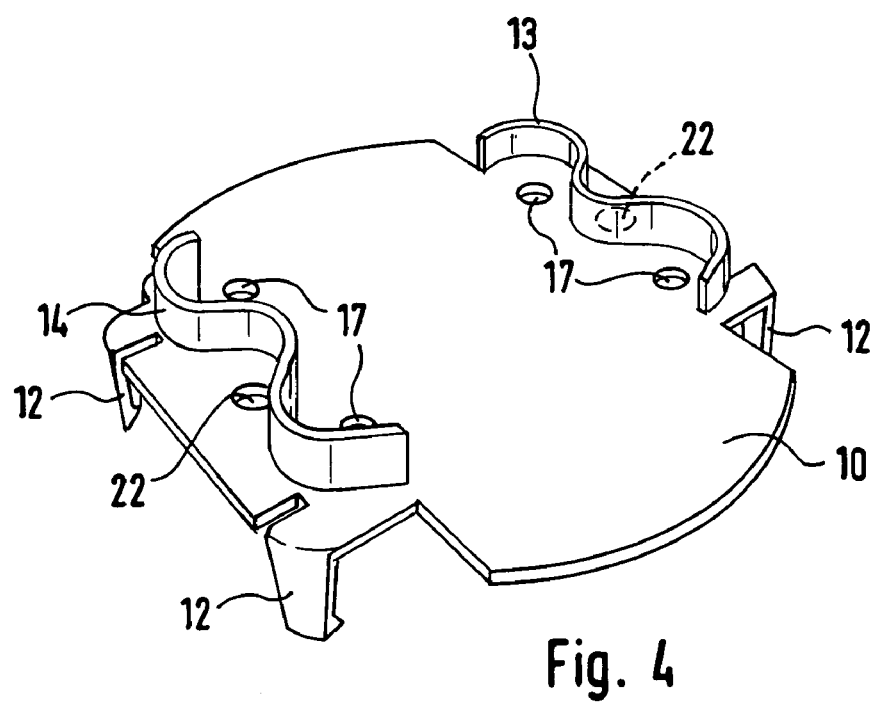
FIG. 4 is a perspective oblique view of such support part.

The plastic support illustrated in the figures is designed in two parts and comprises a plate-like support part 10 and a plate-like cover part 11. The support part depicted in FIGS. 3 and 4 in two views possesses hook-like integrally molded holding projections 12 at its four corners. Such projections serve for clipping the entire plastic support on a hammer, not illustrated, with whose aid the plastic support may be struck against the end of a log. Then the teeth 13 and 14, seen from FIG. 4 to be in the form of corrugated fasteners, bite into the end of the log and thus secure the plastic support to the log. The four hook-like holding projections 12 fit into a circular groove in the hammer head. This is a feature described in detail in the initially mentioned prior art or of the German patent publication 3,837,175.

The cover part 11 possesses a central pot-like projection 15 and at the four corner parts has four attachment pins pointing in the opposite direction to the pot-like projection 15, such pins being designed for fitting into four corresponding pin receiving means 17 in the support part 10. The number of the attachment pins and attachment pin receiving means may also be smaller, for example 2 or 3, or also greater. The cover part 11 is for fitting in place so plugged to the support part 10 that the attachment pins 16 fit into the attachment pin receiving means 17. Here they are secured by clamping, locking, bonding and/or welding so that the plastic support depicted in figure is formed.

On fixing the cover part 11 on the support part 10 a gap-like intermediate space is left free between the cover part 11 and the support part 10 so that a plate-like transponder support 18 may be inserted between them. The attachment pins 16 then serve as guide means.

By forming two U-like slots 19 two elastic, resilient lugs 20 are formed in the cover part, such lugs each possessing a detent projection 21 on the side facing the support part 10 in the secured or attached condition. During insertion of the transponder support 18 this detent projection fits into two corresponding through holes in the transponder support 18 and in so doing locks the transponder support 18 in the plastic support. The through holes in the transponder support 18 are not visible in the drawing.

In lieu of two elastic lugs 20 there may naturally be a different number thereof. In the simplest case a single resilient lug could be provided, although four resilient lugs have been found to be more advantageous in order to firmly lock the transponder support 18 in the plastic support. Moreover, in alternative designs other known detent means may be employed, as for example catch means which snap into notch-like recesses at the edge of the transponder support 18.

The support part 10 and the cover part 11 each also possess two through holes 22, which in the attached condition are flush with each other, at opposite edge portions, which serve for slipping or threading the plastic support onto a U-like receiving means of metal or plastic material belonging to a support magazine, not illustrated.

The cover part 11 and the support part 10 respectively comprise a plastic material, possibly a material employed in paper making in the relevant process.

Instead of the described two-part design of the plastic support same may in principle be molded integrally of plastic, interlocking features for locking the transponder support having to be provided.

The transponder support 18 is in the form of an elongated plastic plate and integrally comprises a transponder, as for example a radio frequency identification (RFID) transponder, and an antenna 23 connected with same in order to increase the range of operation, if a transponder containing a memory chip is fed wireless manner with marking data or if such marking data are to be read in a wireless manner using a suitable reading device (as for example an RFID reading device).

The transponder support 18 is either supplied in a pre-mounted state with the transponder support (with or without stored data) and then driven into a piece of timber or a transponder support already previously secured to a tree trunk is inserted into a plastic support and retained by catch means. By means of a portable transmitting and receiving means the necessary or desired data of such trunk or log may be entered or supplemented to the extent that such data are not yet stored. In this respect it is for instance a question of the trunk serial number, a trunk subnumber, the type of timber, the length, the diameter, the quality class or the like. Furthermore the name of the forest enterprise, the name of the timber feller, the name of the person shifting the timber, and later the name of the transport undertaking or the like may be entered. The trunk may then be identified at any time by wireless, be it in connection with storage, keeping an inventory, marking packages of sawn timber, loading and unloading trucks (bill of lading) or the like. Such a bill of lading is then for example automatically produced on reading the transponders on loading a truck or the like so that for example on the arrival of the truck at a timber processing plant the bill of lading may be immediately communicated in a wireless manner. Using electronic means the previously advised list or bill may be compared with the actual list. During storage added and removed trunks may be automatically checked. During sawing in a sawing mill an automatic booking of sawing, an account of yield (if necessary, trunk by trunk) and automatic booking of the stock may take place. In the forest itself stock taking for the forest ranger or for log acceptance by a buyer may be performed in a simple manner.

The detachment of the transponder support for reuse prior to timber processing may also be performed automatically. Using a trimming knife each respective pot-like projection 15 of the cover part 11 may be struck and detached so that either the cover part 11 is broken into pieces or the attachment pins 16 themselves are broken off. The cover part 11 then drops in one or several pieces into a receiving container together with the now separated transponder support 18. The transponder supports may then be collected together for the data to be cancelled. The transponder supports 18 may then be reused and inserted into a new respective plastic support.

The invention claimed is:

1. A plate-like plastic support with a transponder having a data memory for the wireless transmission of data to and from the plastic support,
    which is provided with attachment means for attachment to objects to be electronically marked,
    wherein the transponder is arranged on or in a transponder support separate from the plastic support,
    such transponder support being adapted to be attached by detent or clamping means to the plastic support;
    wherein said clamping means is in the form of integrally formed protruding projections capable of being driven by impact into the object to be marked; and
    further comprising four hook-like holding projections formed adjacent four corners of the plastic support, said projections pointing in opposite directions from said protruding projections, said hook-like projections being adapted for clipping onto a hammer head.

2. The plastic support as set forth in claim 1, having a slot for receiving the transponder support, which is plate-like.

3. The plastic support as set forth in claim 2, having at least one flexible detent lug for snapping into a corresponding detent recess in the transponder support, such recess being preferably integrally formed or formed by having U-like slots.

4. The plastic support as set forth in claim 3, wherein the at least one detent lug is provided with a detent projection provided to fit in the detent recess, such detent recess being in the form of a through hole or a well in the transponder support.

5. The plastic support as set forth in claim 1, comprising a plate-like support part provided with the attachment means and a plate-like cover part, which are connected together or able to be connected together, the transponder support being able to be fitted betwixt same with a detent or clamping action.

6. The plastic support as set forth in claim 5, wherein the support part or the cover part is provided with attachment pins designed, for attachment of the two parts together, to fit into corresponding pin receiving means in the respectively other part.

7. The plastic support as set forth in claim 5, wherein the cover part is provided with a projection to be struck for detachment of the cover part from the support part.

8. The plastic support as set forth in claim 1, wherein the transponder support is in the form of an elongated plate and in addition to the transponder bears a transmitting and/or receiving antenna.

9. The plastic support as set forth in claim 1, wherein the said transponder is in the form of an RFID transponder.

* * * * *